June 20, 1961 H. THOMA 2,988,927
CONTROL MEANS FOR INFINITELY VARIABLE TRANSMISSIONS
Filed Feb. 6, 1959
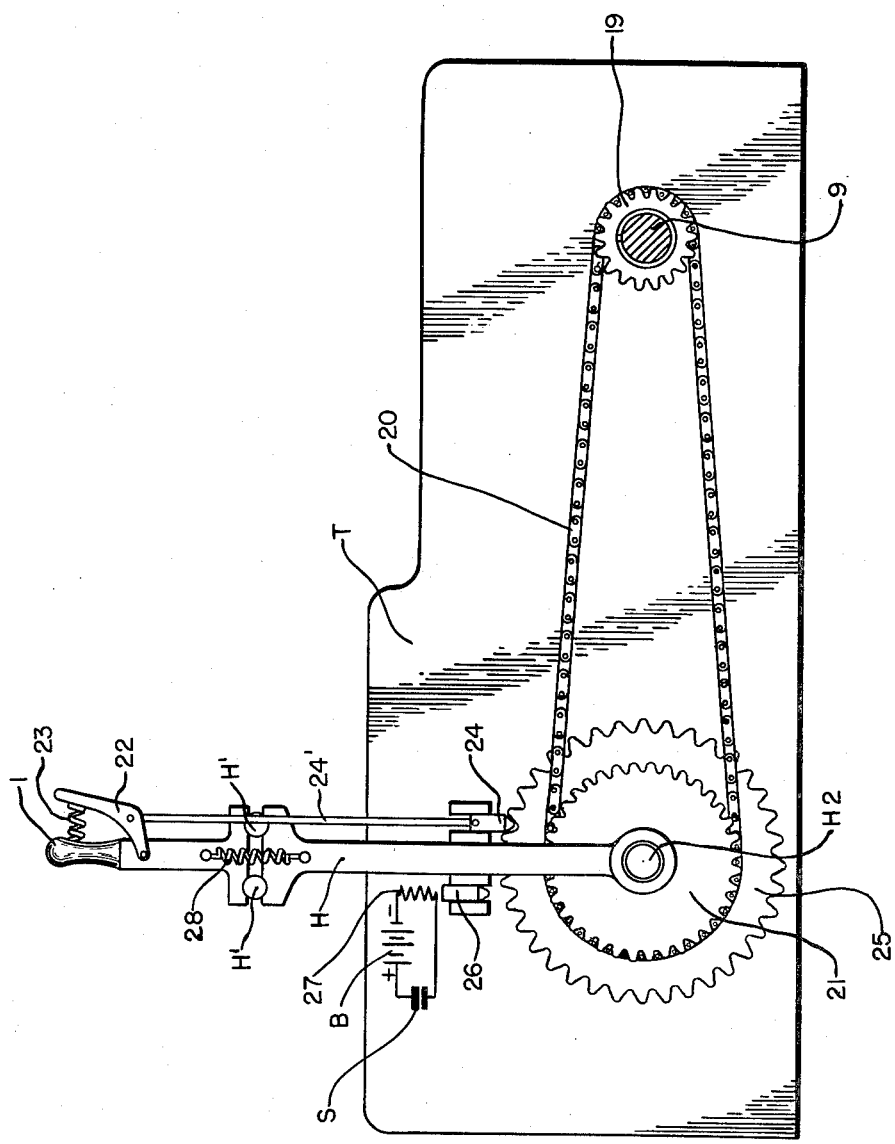
HANS THOMA INVENTOR.
BY Allen A. Klicker
Attorney

# United States Patent Office 2,988,927
Patented June 20, 1961

2,988,927
CONTROL MEANS FOR INFINITELY VARIABLE TRANSMISSIONS
Hans Thoma, Rotfluhstrasse 10, Zurich, Switzerland
Filed Feb. 6, 1959, Ser. No. 791,633
5 Claims. (Cl. 74—335)

This invention relates to control means for infinitely variable transmissions and has for an object to provide control means for such transmissions which when manually adjusted away from zero position provide a speed control for the output member of the transmission and when moved to the zero or neutral position provides a position control.

The present invention constitutes in some respects an improvement on the invention of Hans Thoma, U.S. Patent 2,872,827, Feb. 10, 1959.

In many types of infinitely variable transmissions which may be adjusted from zero to a maximum in either direction, such as some electrical drives, hydrostatic transmissions and also some types of friction drives, it is desirable to cause the output shaft to stand still although the input shaft is rotating. In the case of a Leonard drive, this is effected through varying the excitation of the Leonard dynamo; with hydrostatic drives through the adjustment of the displacement of one unit or through a reversing valve; and in the case of a friction drive consisting of an output friction wheel and input friction disk by moving the output friction wheel to the center of the input friction disk.

Such devices are often used in cases where the output shaft is loaded as, for example, through a suspended weight as in a hoisting crane. In all of these cases, there is the difficulty that the setting for zero speed of the output shaft is uncertain or inexact so that even with well made adjusting means a very slow movement or "creeping" of the output shaft forward or rearward takes place and, in the case of a hoist, sinking of the load is difficult to avoid. In the case of a hoist of the type mentioned, the suspended heavy weight sinks gradually even when the control lever is at zero. A certain load may be held from sinking by justifying the adjustment. However, with the same setting, when the lifting gear is not loaded it will rise, and will sink when a greater load is applied.

This is because all such drives have a certain amount of slip, namely that for a certain setting of the control lever the output speed is a function of the load even though the input shaft is driven with unchanged speed. In the case of the Leonard drive, this slip depends, for example, upon the copper resistance of the circuit. In the case of friction drives, a so-called boring friction occurs which shifts its position according to the load. In the case of hydrostatic hydraulic drives, the slip is caused mostly by leakage which is dependent upon the pressure which varies with the load and also with the temperature just as the electrical resistance varies in the case of the Leonard drive. In the case of friction drives, the location of the friction contact is dependent on temperature and load and therefore causes a variation of slip.

It is an object of the invention to overcome these difficulties of the known controls of adjustable transmissions by providing a mechanical feedback from the output member of the transmission so arranged that it will move the transmission control means toward the neutral position whenever the operator releases the transmission control handle.

Another object is to provide means to make said feedback operation effective at the desired limit position or positions of a member operated by said transmission.

It is a more specific object to provide such a feedback control means in which the output means of the transmission moves the transmission control handle to neutral through detent means.

Another object of the invention is to provide means whereby the output member of the transmission may be coupled with the transmission control lever not only in the vicinity of the neutral position but in any location of the control lever.

Another object is to provide such means which become automatically effective whenever the control lever is released to provide in effect a so-called "dead man's control."

Further objects and advantages of this invention will be apparent from consideration of the specification and the accompanying drawing which shows more-or-less schematically one form the invention may take.

Referring to said drawing, H indicates generally a manually operated control handle which may be moved by the operator forward or rearward from the neutral position shown. Said handle H is provided with the end portion 1 normally grasped by the operator. In the form shown, the portion 1 is connected to the main part H of the handle by strong springs 28 acting against abutment members H'. The handle H is shown connected to the control shaft H2 of the control organ of the transmission unit T. In the case of an hydraulic transmission, the member H2 may be the volume varying element of the pump for controlling the fluid delivery of the pump from zero to a maximum in either direction. 9 indicates the output shaft of the transmission upon which is fixed a chain sprocket 19. As is well known in the case of hydraulic transmissions, said shaft 9 is driven by an hydraulic motor which receives the fluid pumped by the variable volume pump mentioned above. It will be seen therefore that shaft 9 stands substantially still when the control organ lever H and connected shaft H2 is in the neutral position shown and rotates in one direction when the lever H and shaft H2 are displaced in one direction and rotates in the opposite direction when the lever H and shaft H2 are displaced in the opposite direction from the neutral position. Since shaft H2 controls the transmission, it controls (via the transmission) the rotation of shaft 9 so that it may stand still or rotate in either direction. Such rotation of output shaft 9 is transmitted to sprocket 21 and ratchet wheel 25, which stand still or rotate freely on shaft H2 in one direction or the other depending upon the rotative condition of output shaft 9 and sprocket 19. The rotation of shaft 9 and sprocket 19 is transmitted to the sprocket 21 via sprocket chain 20. 20 is a chain engaging said sprocket 19 and also a driven sprocket 21 which is connected for rotation with a ratchet wheel 25. The wheels 21 and 25 at certain times rotate freely on the shaft H2 but may be operatively connected thereto by means described hereinafter. 24 indicates a detent pawl slidable up and down in guides H" attached to the handle H, which pawl is normally held downward by the rod 24' connected thereto and to a hand grip lever 22 pivoted to the handle end portion 1 and biased therefrom by means of compression spring 23.

In use, the operator grasps the hand grip lever and handle end 1 and moves them together to raise pawl 24 from its recess between two adjacent teeth on the ratchet wheel 25. He thereupon moves the lever 1, and therethrough the lever H and control shaft H2, either clockwise or counter-clockwise as required, thereby causing the shaft 9 to be rotated. The chain drive means together with the ratchet wheel 25 rotate correspondingly and freely on shaft H2. After the transmission has operated almost sufficiently far (as for example, hoisting or lowering a load), the operator normally moves the control lever 1, H to substantially neutral position. This causes the transmission output shaft 9 as well as the chain drive and ratchet wheel 25 to stop. The operator may now release the hand grip lever 22 whereby pawl 24 drops and engages a space between the teeth of ratchet wheel 25. If thereupon, through slippage in the transmission or otherwise, the output shaft 9 should be rotated by the load thereon, the handle H will be moved by ratchet wheel 25 acting through pawl 24 in a direction to overcome said movement and to restore the parts to their original position. If, during normal operation, the operator should become disabled so that he would release the hand grip 22, the handle H and control shaft H2 would immediately be restored to the neutral position as a result of the engagement of pawl 24 with the rotating ratchet wheel 25.

The numeral 26 indicates a pawl carried by lever H in guides H''', which pawl may be magnetically withdrawn by solenoid 27 when the latter is energized. For this purpose, a source of electrical energy such as battery B may be connected to the solenoid. S indicates a limit switch which is, in the usual manner, associated with the driven mechanism so that when the latter approaches the limit of its movement the switch circuit will be broken. This de-energizes the solenoid 27 and allows pawl 26 to drop and to engage one of the spaces between the teeth on ratchet wheel 25. As a result thereof, the rotating ratchet wheel 25 will cause the lever H and control shaft H2 to be returned to the neutral position. This means has the effect of stopping the mechanism automatically when a limit position is reached.

This effect will be obtained even though the operator attempts to hold the hand lever 1 from moving, assuming that the detent 26 is sufficiently positive. Breakage due to holding the hand lever is avoided by utilizing the spring connection 28 between the handle end 1 and the lever H.

Various forms of construction utilizing the present invention may, of course, be resorted to.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. Control means for infinitely variable power transmissions which have continually operating power input means, power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output means being determined by the direction of movement of said manually operated means from its zero position, together with supplemental control means for said control organ operated by said output means and so arranged that, when effective, it causes said manually operated member to be moved from any position to zero position, said supplemental control means being normally in effective position, together with means for making said supplemental control means ineffective at will so that the manually operated means may be moved to adjust said control organ as desired.

2. Control means for infinitely variable power transmissions which have continually operating power input means, power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output means being determined by the direction of movement of said manually operated means from its zero position, together with supplemental control means for said control organ operated by said output means and so arranged that, when effective, it causes said manually operated member to be moved from any position to zero position, together with spring means for normally holding said supplemental means in effective position together with means operable by the operator to overcome the action of said spring means and to make said supplemental control means ineffective so that the manually operated means may be moved to adjust said control organ as desired, whereby if the operator should become disabled the spring means will cause said supplemental control means to become effective, whereupon the output means will move said manually operated means and said control organ to the zero position.

3. Control means for infinitely variable power transmissions which have continually operating power input means, power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output means being determined by the direction of movement of said manually operated means from its zero position, together with supplemental control means for said control organ operated by said output means and so arranged that, when effective, it causes said manually operated member to be moved from any position to zero position, said supplemental control means being normally in effective position, together with means mounted upon said manually operated means and arranged for making said supplemental control means ineffective at will so that the manually operated means may be moved to adjust said control organ as desired.

4. Control means for infinitely variable power transmissions which have continually operating power input means, power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output means being determined by the direction of movement of said manually operated means from its zero position, together with supplemental control means for said control organ operated by said output means and so arranged that, when effective, it causes said manually operated member to be moved from any position to zero position, together with spring means for normally holding said supplemental control means in effective position, together with means mounted on said manually operated means operable by the operator to overcome the action of said spring means and to make said supplemental control means ineffective so that the manually operated means may be moved to adjust said control organ as desired, whereby if the operator should become disabled the spring means will cause said supplemental control means to become effective, whereupon the output means will move said manually operated means and said control organ to the zero position.

5. Control means for infinitely variable power transmissions which have continually operating power input means, power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output means being determined by the direction of movement of said manually operated means from its zero position, together with supplemental control means for said control organ operated by said output means and so arranged that, when effective, it causes said manually operated member to be moved from any position to zero position, together with electro-magnetic means which when effective holds said supplemental control means in ineffective position, and an electric circuit including an electric power source and a limit switch which, when closed, causes said electro-magnetic means to be effective and said supplemental control means to be ineffective, and means operated by said output means for opening said limit switch.

References Cited in the file of this patent

UNITED STATES PATENTS

| | | |
|---|---|---|
| 2,277,966 | Franzkowiak | Mar. 31, 1942 |
| 2,561,546 | Wallace | July 24, 1951 |
| 2,631,473 | Page | Mar. 17, 1953 |
| 2,872,827 | Thoma | Feb. 10, 1959 |